(No Model.)
C. ACKERSON.
FISHING DEVICE.
No. 554,764.                            Patented Feb. 18, 1896.
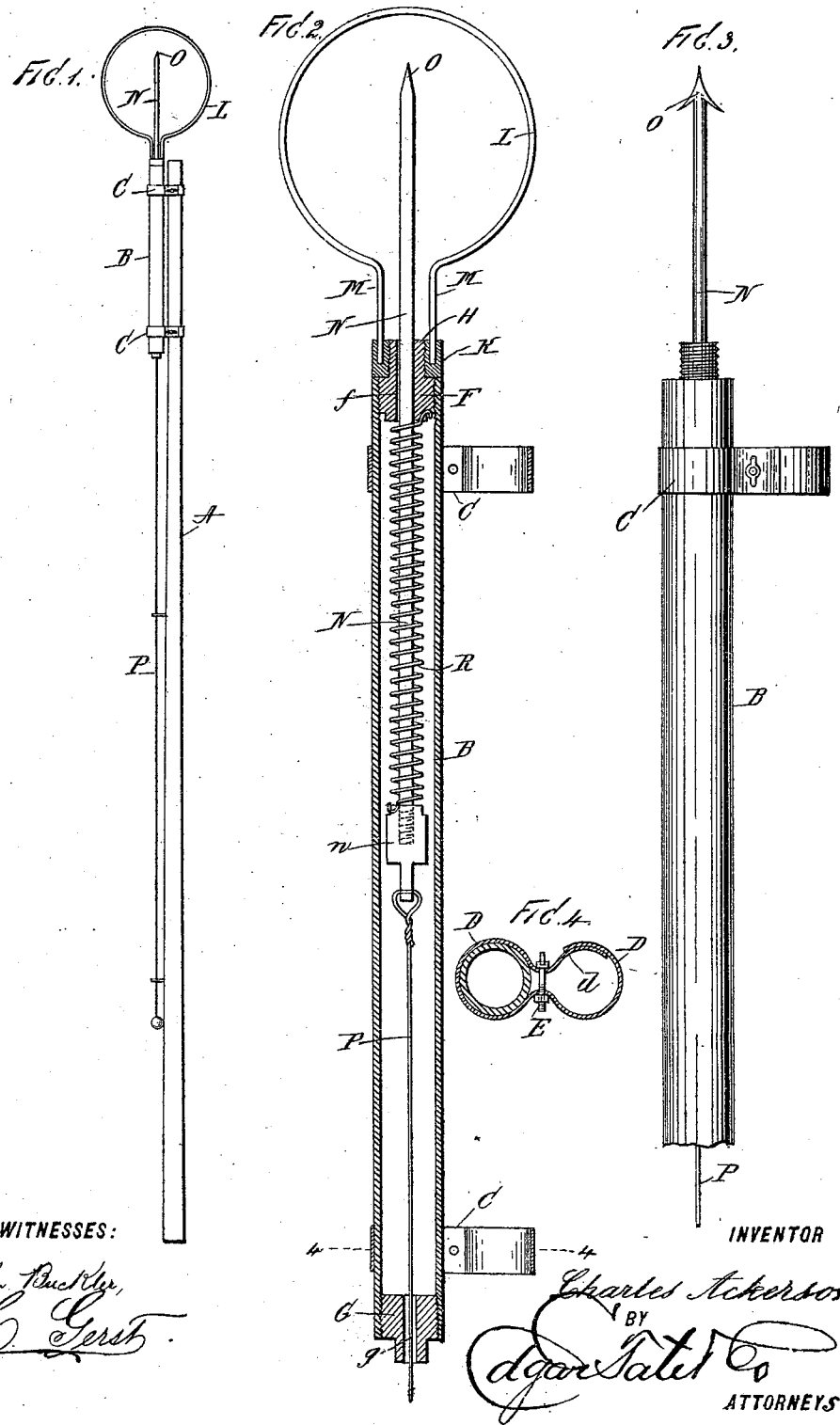
WITNESSES:
John Buckler,
C. Gerst.
INVENTOR
Charles Ackerson,
BY Edgar Tate & Co.
ATTORNEYS

United States Patent Office.

CHARLES ACKERSON, OF PATERSON, NEW JERSEY.

FISHING DEVICE.

SPECIFICATION forming part of Letters Patent No. 554,764, dated February 18, 1896.

Application filed September 19, 1895. Serial No. 562,957. (No model.)

*To all whom it may concern:*

Be it known that I, CHARLES ACKERSON, a citizen of the United States, and a resident of Paterson, in the county of Passaic and State of New Jersey, have invented certain new and useful Improvements in Fishing Devices, of which the following is a specification, reference being had to the accompanying drawings, forming a part thereof, in which similar letters of reference indicate corresponding parts.

This invention relates to devices for catching fish, and particularly to that class thereof known as "fish-spears," and the object is to provide a device of this class which is simple in construction and effective in operation; and with this and other objects in view the invention consists in the construction, combination, and arrangement of parts hereinafter described and claimed.

The invention is fully disclosed in the following specification, of which the accompanying drawings form a part, in which—

Figure 1 is a side elevation of my improvement; Fig. 2, a central longitudinal section of that part thereof to which the spear is attached; Fig. 3, a partial elevation of the same construction with parts thereof removed, and Fig. 4 a section on the line 4 4 of Fig. 2.

In the practice of my invention I employ a rod A, which may be of any desired material, preferably of wood, and to one end thereof I secure a short tubular rod B, by means of clamps C, which are of the form and construction shown in Fig. 4, each being composed of double rings D, formed of sheet metal, one of which is open at $d$, and the sides thereof being contracted at the central portion, through which is passed a bolt E.

The tubular rod B is closed at one end by a screw-threaded plug F and at the other by a screw-threaded plug G, each of which is provided with a central bore $f$ and $g$, respectively, and the plug F is provided with a screw-threaded extension H, to which is secured a ring K, which carries a ring or snare L, provided with projecting arms M, which are secured to the ring K.

Within the tubular rod B is placed a spear-shaft N, provided with a head $n$ and a point or barb O, said shaft being adapted to be projected through the central bore $f$ of the head F into and approximately through the ring or snare L, and connected with the head $n$ of the spear-shaft is a cord, wire, or rod P, and mounted on said shaft is a spiral spring R, one end of which is secured to the head F, by which one end of the tubular rod B is closed, and the other end of which is secured to the head $n$ of the spear-shaft, said spring being adapted to project said shaft into the snare-ring L.

The operation will be readily understood from the foregoing description, when taken in connection with the accompanying drawings. The snare-ring L is preferably composed of brass or copper, so as to present a bright surface, and the device, as will be understood, is adapted for use in clear water.

In operation, the rod A is manipulated in such manner as to pass the snare-ring L around the fish, the spear-shaft N being withdrawn at this time, by means of the rod P, from the snare-ring, and when the fish has entered the snare-ring or the latter has been so manipulated as to inclose the body thereof, as above described, the rod P is released and the spear-shaft projected into the snare-ring, as shown in Fig. 2, thus piercing the fish and securely holding it within the ring.

In the construction shown in Fig. 3 the snare-ring is omitted, together with the ring by which it is secured to the tubular rod B, and this device may be operated, as will be understood, in certain cases, without the addition of the snare-ring. The point of the spear-shaft may be provided with a barb, as shown in Fig. 3, or simply sharpened, as shown in Fig. 2, these elements of construction being immaterial, except when the snare-ring is omitted, in which case it will be necessary to barb the point of the spear-shaft, as shown in Fig. 3, and in this case the rod A may also be omitted and the tubular rod B extended so as to constitute a handle for the device.

My invention is not limited to the exact form, construction, and combination of parts shown, as it is evident that changes therein and modifications thereof may be made without departing from the spirit of the invention or sacrificing its advantages, and I therefore reserve the right to make all such alterations therein as fairly come within the scope of the invention.

Having fully described my invention, I claim and desire to secure by Letters Patent—

1. A fish-spear comprising a tubular rod, one end of which is closed by a plug having a central bore, a spear-shaft located in said tubular rod and adapted to be projected through the central bore of said plug, a spiral spring mounted on said spear-shaft, one end of which is secured to said plug, and the other end of which is secured to the head of the shaft, and means for operating said shaft, consisting of a wire, rod or similar device, connected with the head of the shaft, and passed out through the end of the tubular rod, the head of said rod through which the spear-shaft is projected, being also provided with a snare-ring into which the pointed end of the spear-shaft is adapted to be projected, substantially as shown and described.

2. The combination in a fishing-spear, of a rod or handle having eyebolts secured therein, the tubular rod secured at one end thereof by means of double rings of sheet metal, one loop or portion of which is adapted to inclose the rod or handle and the other loop or portion to inclose the tubular rod, and a bolt carrying adjusting-nuts passing through said double ring intermediate of the loops to secure said tubular rod in any desired position upon the handle, the upper end of said tubular rod being closed by a plug having a central bore, the opposite end of said tubular rod being closed by a similar plug having a screw-threaded extension, a spear-shaft located within said tubular rod and adapted to be projected through the last-mentioned plug and a spiral spring on said shaft operating against the last-mentioned plug and the head on said shaft, the wire or rod connected with the head of the shaft and passing out through the first-mentioned head, and the tubular rod and through the eyebolts or staples on the handle, the ring or collar secured upon the screw-threaded extension of the last-mentioned plug, a snare-ring secured to said annular ring, whereby the spear may be projected into said snare-ring, substantially as described.

In testimony that I claim the foregoing as my invention I have signed my name, in presence of the subscribing witnesses, this 17th day of September, 1895.

CHARLES ACKERSON.

Witnesses:
C. GERST,
K. ENSLIE.